US012715284B2

(12) United States Patent
Nava Rodriguez

(10) Patent No.: US 12,715,284 B2
(45) Date of Patent: Aug. 25, 2026

(54) VEHICLE DRIVESHAFT ASSEMBLY

(71) Applicant: NISSAN NORTH AMERICA, INC., Franklin, TN (US)

(72) Inventor: Jonathan Nava Rodriguez, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 228 days.

(21) Appl. No.: 18/731,213

(22) Filed: May 31, 2024

(65) Prior Publication Data

US 2025/0368034 A1 Dec. 4, 2025

(51) Int. Cl.
*B60K 17/22* (2006.01)
*B62D 65/10* (2006.01)
*B65D 59/06* (2006.01)
*B65D 85/68* (2006.01)

(52) U.S. Cl.
CPC .............. *B60K 17/22* (2013.01); *B62D 65/10* (2013.01); *B65D 59/06* (2013.01); *B65D 85/68* (2013.01); *B65D 2585/6882* (2013.01)

(58) Field of Classification Search
CPC ........ B60K 17/22; B60K 27/24; B62D 65/10; B62D 59/06; B62D 85/68; B62D 2585/6882; F16C 3/02; F16C 2326/06
See application file for complete search history.

(56) References Cited

U.S. PATENT DOCUMENTS 673,236 A * 4/1901 Brewington ........... B65D 41/02 215/358
2,151,508 A * 3/1939 Glensky ................. B65D 41/62 215/326
2,873,765 A * 2/1959 Gregory ................ E21B 17/006 138/96 R
3,785,519 A * 1/1974 Huh ....................... B65D 41/42 215/254
4,815,884 A * 3/1989 Halliday, Jr. ....... B25B 27/0028 403/17
5,979,695 A * 11/1999 Valls ...................... A23G 9/503 220/666
5,996,833 A * 12/1999 Lencioni ................ B65D 41/62 220/270

(Continued)

FOREIGN PATENT DOCUMENTS

JP 2012154377 A * 8/2012

OTHER PUBLICATIONS

Machine translation of JP 2012154377 A, obtained from FIT database (Year: 2012).*

(Continued)

*Primary Examiner* — Thomas C Diaz
(74) *Attorney, Agent, or Firm* — Spencer Fane, LLP

(57) ABSTRACT

A vehicle driveshaft assembly includes a first driveshaft axle and a first cap. The first driveshaft axle has a transaxle end for being installed to a vehicle transaxle. The first driveshaft axle having a wheel end for being installed to a first vehicle wheel. The first driveshaft axle further has a constant velocity joint disposed between the transaxle end and the wheel end. The first cap is provided over the transaxle end. The first cap has a corrugated portion that is compressible so that the first cap moves between a non-compressed state and a compressed state as the transaxle end is inserted into the vehicle transaxle.

15 Claims, 5 Drawing Sheets

(56) References Cited

U.S. PATENT DOCUMENTS

| | | | | | |
|---|---|---|---|---|---|
| 6,159,104 | A * | 12/2000 | Mikeska | F16D 3/841 | 464/170 |
| 6,286,702 | B1 * | 9/2001 | Buermann | B65D 83/70 | 215/253 |
| 6,854,616 | B2 * | 2/2005 | Steffan | B65D 59/06 | 220/793 |
| 7,178,425 | B2 * | 2/2007 | Marich | F16H 57/031 | 74/607 |
| 2021/0348709 | A1 * | 11/2021 | Nommensen | E21B 17/006 | |

OTHER PUBLICATIONS

ACDelco, Drive Shaft Seal Kit—Front, https://www.homedepot.com/p/ACDelco-Drive-Shaft-Seal-Kit-Front-19258265/308451697?source=shoppingads&locale=en-US&srsltid=AfmBOopxQtE9TI8moNXJzN8ykdOpE2rrLxr-LIq5k-XvoxLdTGzzgaYFzDY, May 31, 2024.

* cited by examiner 16
16A
24
78
66
68
12
46

16
16B
66
78
68
12
46

16
36
16A
74
72
68
78
24
66

12
46
16
36
16A
24
78
66
68
72
74

12
46

VEHICLE DRIVESHAFT ASSEMBLY

BACKGROUND

Technical Field

The present disclosure generally relates to a vehicle driveshaft assembly. More specifically, the present disclosure relates to a vehicle driveshaft assembly equipped with a protective cap.

Background Information

Vehicle drivetrains can include one or more protective caps provided to protect one or more vehicle driveshafts from premature wear or corrosion. Protective caps are designed and configured to protect the components of a drivetrain's ends from outside contaminants, and to protect splines and other components of the ends.

SUMMARY

In view of the state of the known technology, one aspect of the present disclosure is to provide a vehicle driveshaft assembly comprises a first driveshaft axle and a first cap. The first driveshaft axle has a transaxle end for being installed to a vehicle transaxle. The first driveshaft axle having a wheel end for being installed to a first vehicle wheel. The first driveshaft axle further has a constant velocity joint disposed between the transaxle end and the wheel end. The first cap is provided over the transaxle end. The first cap has a corrugated portion that is compressible so that the first cap moves between a non-compressed state and a compressed state as the transaxle end is inserted into the vehicle transaxle.

In view of the state of the known technology, another aspect of the present disclosure is to provide a vehicle driveshaft cap comprising a conical shaped main body, a first end, a second end and a corrugated portion. The conical shaped main body defines an internal space of the cap. The first end is closed. The second end includes an opening that leads to the internal space. The second end is a driveshaft receiving end. The corrugated portion is compressible so that the cap moves between a non-compressed state and a compressed state.

In view of the state of the known technology, another aspect of the present disclosure is to provide a method for installing a vehicle driveshaft to a vehicle transaxle. The method comprises inserting a first cap over a transaxle end of a first driveshaft axle. The first drive axle having a wheel end that is an opposite end of the first driveshaft axle with respect to the transaxle end. The method further comprises inserting the transaxle end into a first opening of the vehicle transaxle. The method further comprises operating a user operations tab of the first cap to compresses the first cap at a corrugated portion. The method further comprises removing the first cap from the transaxle end by breaking the first cap at perforations of the first cap so that the first cap separates into a first piece and a second piece.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
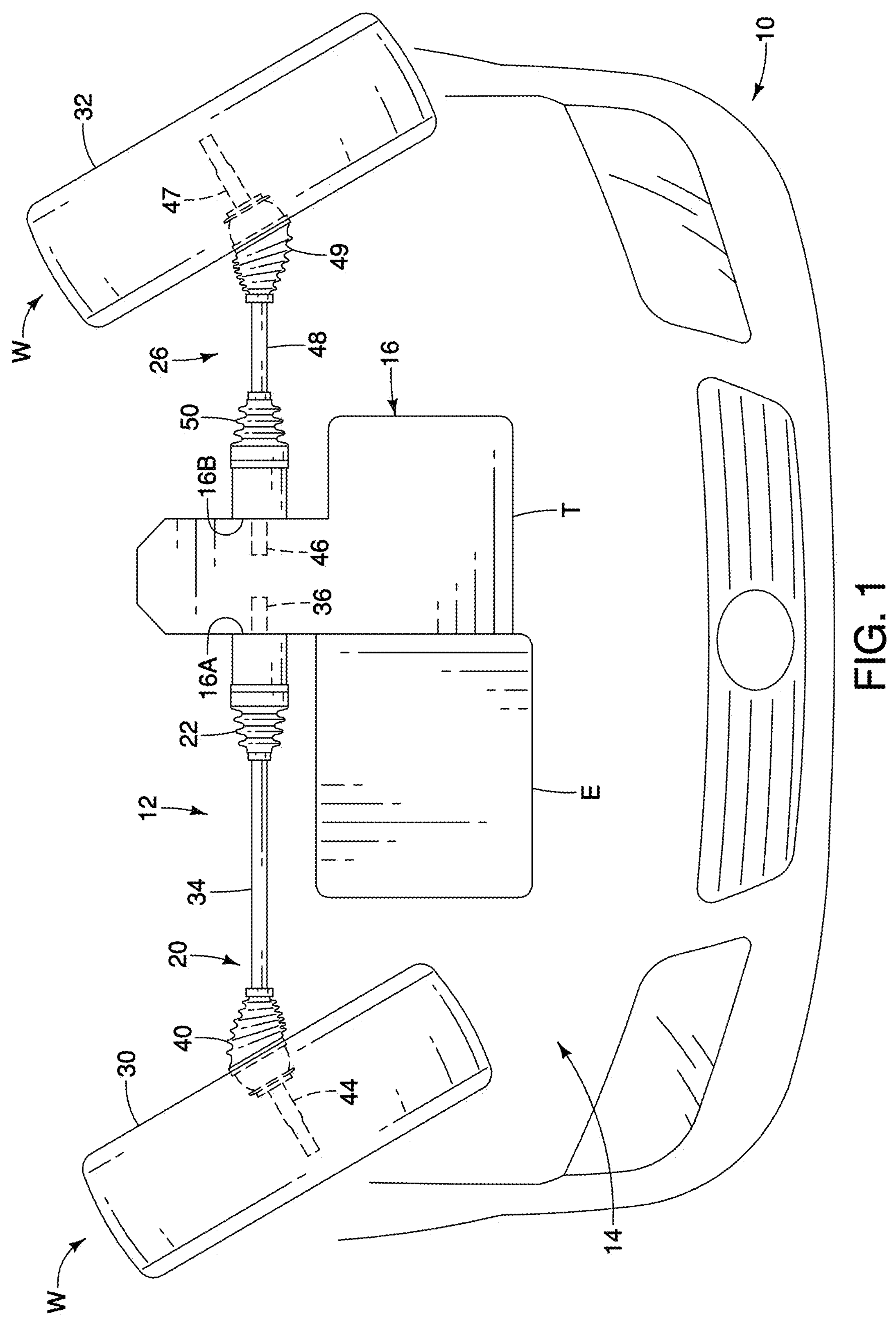
FIG. 1 is a top plan view of a portion of a vehicle engine compartment equipped with a driveshaft assembly in accordance with an illustrated embodiment.

Referring now to FIG. 1, a vehicle 10 is illustrated as equipped with a vehicle driveshaft assembly 12. The vehicle 10 has an engine compartment C that houses a transaxle 16 and the driveshaft assembly 12 for transferring power between the engine E and a wheel hub assembly H of the vehicle 10. In the illustrated embodiment, the transaxle 16 can include an engine E and a transmission T (e.g., a continuously variable transmission, or differential, or speed changing device). As shown in FIG. 1, the transaxle 16 includes a pair of first and second openings 16A and 16B for receiving the driveshaft assembly 12.

The vehicle driveshaft assembly 12 comprises a first driveshaft axle 20, a constant velocity joint 22 and a first vehicle driveshaft cap (first cap 24). The first driveshaft axle 20 is connected to the transaxle 16 at the first opening 16A of the transaxle 16. The vehicle driveshaft assembly 12 further comprises a second driveshaft axle 26 and a second vehicle driveshaft cap (second cap 28). The second driveshaft axle 26 is connected to the transaxle 16 at the second opening 16B of the transaxle 16. The first and second caps 24 and 28 are provided for sealing and protection of the first and second driveshaft axles 20 and 26 prior to connection with the transaxle 16, as will be further described below.

The driveshaft assembly 12 connects the transaxle 16 and the wheel hub assembly H to transfer torque from the transaxle 16 to a pair of drive wheels W of the vehicle 10. While the vehicle 10 is illustrated as having a front wheel drive that is a two-wheel drive, it will be apparent to those skilled in the vehicle field from this disclosure that the driveshaft assembly 12 described herein can be implemented with a rear wheel drive having a rear-mounted engine or with a four-wheel drive vehicle. Further, the driveshaft assembly 12 having the first and second caps 24 and 28 can be used for a vehicle having a conventional engine or for an electric vehicle.

Figures 2, 3:
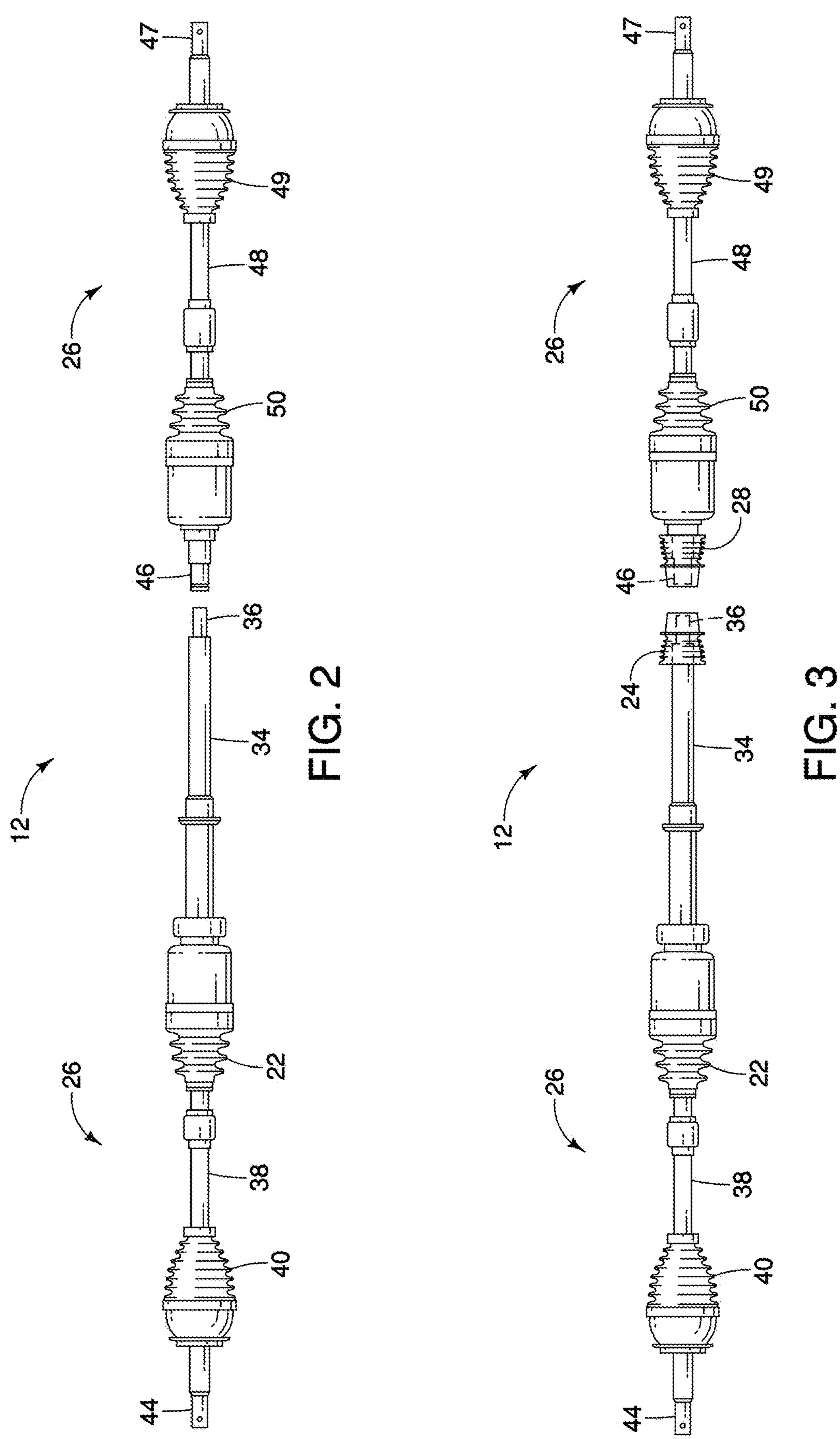
FIG. 2 is a plan view of the driveshaft assembly of FIG. 1.
FIG. 3 is a plan view of the driveshaft assembly including first and second protective caps.

The driveshaft assembly 12 couples the transaxle 16 that produces the power for driving the vehicle 10 and transfers the power to the drive wheels W as mechanical power to rotate the wheel axles. In particular, power is conveyed from the transaxle 16 to the drive wheels W by first and second driveshaft axles 20 and 26. In this way, the driveshaft assembly 12 is configured and positioned to allow longitudinal movement in order to compensate for the vehicle's 10 tolerances. At the same time, the driveshaft assembly 12 is configured to allow for angular movement during use to absorb the motion of the vehicle's 10 suspension (not shown). As seen in FIG. 2, the driveshaft assembly 12 is supported to the engine by one or more trim parts.

In the illustrated embodiment, the driveshaft assembly 12 comprises the first and second driveshafts or axles 20 and 26 and a pair of first and second caps 24 and 28 for the first and second driveshaft axles 20 and 26 respectively. The first driveshaft axle 20 is a passenger side axle that connects the transaxle 16 to a first (passenger side) vehicle wheel 30. The second driveshaft axle 26 is a driver side axle that connects the transaxle 16 to a second (driver side) vehicle wheel 32. The first and second driveshaft axles 20 and 26 are considered CV axles or constant velocity axles. As stated, it will be apparent to those skilled in the vehicle field from this disclosure that the first and second caps 24 and 28 can be provided for additional or alternative driveshaft axles for rear-wheel drive or four-wheel drive vehicles.

Referring to FIGS. 2 and 3, the first driveshaft axle 20 comprises a longstem 34 that is an axle configured to be supported to the transaxle 16. The first driveshaft axle 20 has a transaxle end 36 that is installed to the first opening 16A of the vehicle transaxle 16. Therefore, the longstem 34 includes the transaxle end 36. The transaxle end 36 includes splines that engage corresponding splines of the transaxle 16. The longstem 34 can optionally include a barshaft 38 leading to a fixed joint 40 that are downstream of the longstem 34 with respect to the transaxle 16. The first driveshaft axle 20 further includes a driveshaft joint 42 that is coupled to the longstem 34. The driveshaft joint 42 of the illustrated embodiment is a constant velocity joint 42. Therefore, the first driveshaft axle 20 has a constant velocity joint 22 disposed between the transaxle end 36 and the wheel end 44. The first driveshaft axle 20 has a wheel end 44 that is installed to the first vehicle wheel 30. The wheel end 44 is an opposite end of the first driveshaft axle 20 with respect to the transaxle end 36.

The constant velocity joint 42 is coupled to the barshaft 38 to transfer torque from the longstem 34 to the barshaft 38. In the illustrated embodiment, the longstem 34 and the barshaft 38 are driveshafts of the first driveshaft axle 20. The fixed joint 40 is configured to be joined to the wheel hub assembly to transfer torque from the engine to the first wheel. The driveshaft further includes a boot disposed over the constant velocity joint 42 to protect the components of the constant velocity joint 42.

Figures 4, 5:
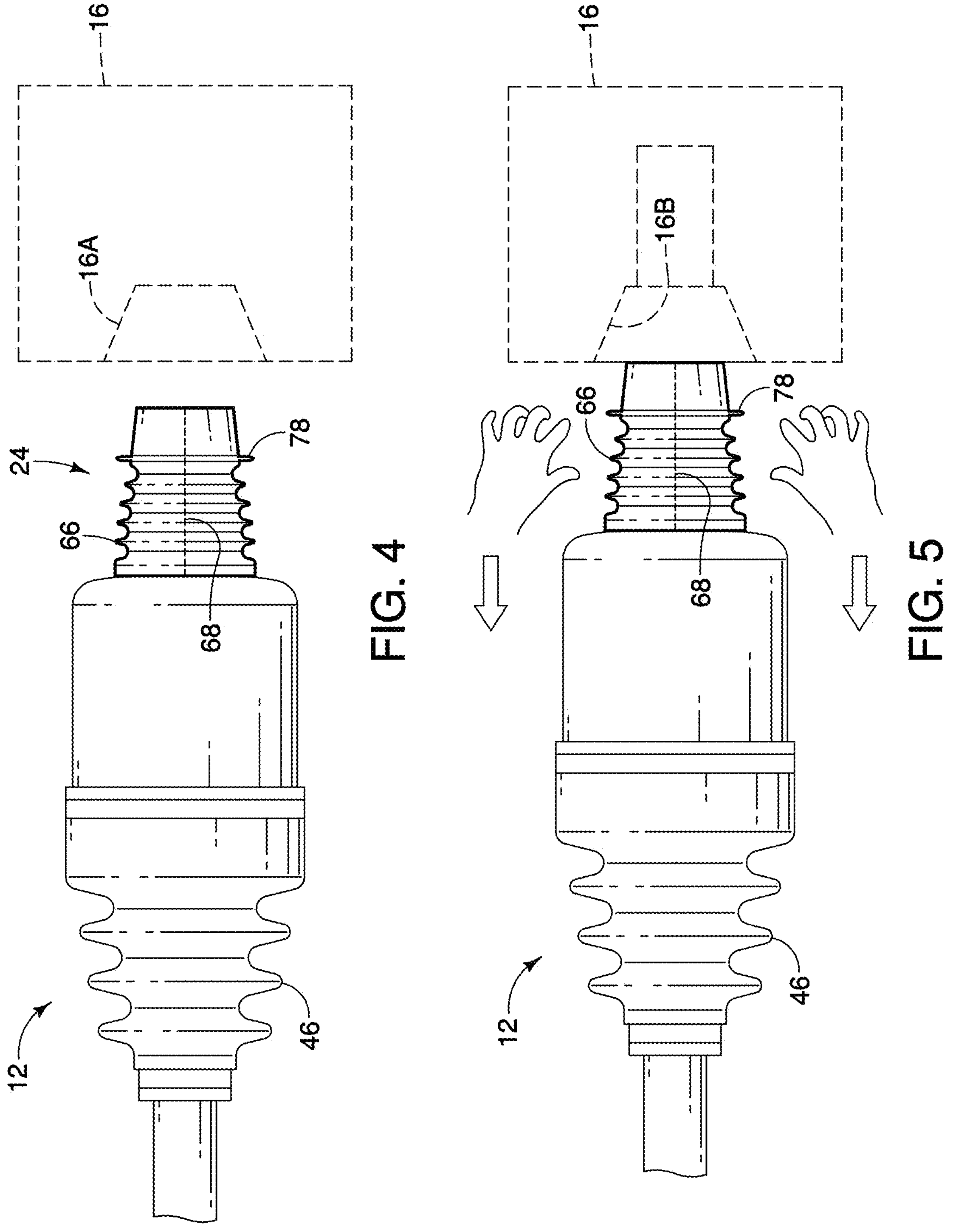
FIG. 4 is an enlarged view of a portion of the driveshaft assembly prior to installation to a transaxle and showing a protective cap in a non-compressed state.
FIG. 5 is an enlarged view similar to FIG. 4 with the driveshaft assembly to at installation with the transaxle and with the protective cap in a non-compressed state.

Referring to FIGS. 2 to 4, the longstem 34 is a rigid metal axle preferably made of stainless steel. The longstem 34 supports the driveshaft to the bracket. During use, the longstem 34 allows angular movement of the driveshaft to absorb suspension motion of the vehicle 10. The movement of the longstem 34 also transfers torque from the maniverter to the barshaft 38. The longstem 34 also operates to transfer torque from the engine to the constant velocity joint 42. The longstem 34 is sized and dimensioned to have a length that accommodates the distance between the transaxle 16 and the first wheel 30 to avoid torque oversteer.

The constant velocity joint 42 is coupled to the second end of the longstem 34 such that the constant velocity joint 42 is disposed between the longstem 34 and the barshaft 38. In other words, the constant velocity joint 42 is disposed at an inboard end of the driveshaft with respect to the fixed joint 40. The constant velocity joint 42 of the illustrated embodiment is also known as homokinetic or a CV joint. The constant velocity joint 42 allows the driveshaft to transmit power through a variable angle, at constant rotational speed, without an appreciable increase in friction or play. Therefore, the constant velocity joint 42 maintains drive to the first wheel while accommodating movement of the driveshaft due to suspension and steering articulation.

The barshaft 38 is a rigid metal axle that transfers torque from the constant velocity joint 42 to the fixed joint 40. As best seen in FIGS. 1 to 3, the barshaft 38 has a first end (e.g., upstream end) coupled to the constant velocity joint 42 and a second end (e.g., downstream end) coupled to the fixed joint 40. The fixed joint 40 transfers torque from the barshaft 38 to the wheel hub assembly H at the same speed of rotation. The fixed joint 40 also allows angular movement of the driveshaft to absorb suspension motion. Thus, the fixed joint 40 is coupled between the barshaft 38 and the first wheel. In the illustrated embodiment, the fixed joint 40 is also a universal joint such as a constant velocity joint 42. The driveshaft axle 20 further includes a fixed joint 40 boot that is disposed over the fixed joint 40 to protect the components of the fixed joint 40 and to keep lubrication inside the fixed joint 40.

As best seen in FIGS. 1 to 3, the second driveshaft axle 26 has a transaxle end 46 that is installed to the second opening 16B of the vehicle transaxle 16. The second driveshaft axle 26 has a wheel end 47 that is installed to the second vehicle wheel 32. The wheel end 47 is opposite of the second driveshaft axle 26 with respect to the transaxle end 46. The second cap 28 is provided over the transaxle end 46 of the second driveshaft axle 26.

Referring to FIGS. 2 and 3, the second driveshaft axle 26 comprises a barshaft 48 and a fixed joint 49 that is identical in form and function to the fixed joint 40 of the first driveshaft axle 20. The second driveshaft shaft 26 further includes a driveshaft joint that is a constant velocity joint 50 that is identical in form and function to the constant velocity joint 42 of the first driveshaft axle 20. The second driveshaft axle 26 has the constant velocity joint 50 disposed between the transaxle end 36 and the wheel end 44 to transfer torque from the transaxle 16 to the second wheel.

In the illustrated embodiment, the first and second caps 24 and 28 are provided to protect the transaxle ends 36 and 46 of the first and second driveshaft axles 20 and 26 prior to assembly to the transaxle 16. The first and second caps 24 and 28 are provided to prevent external debris or leaks from contaminating the transaxle ends 36 and 46 prior to installation. That is, the first and second caps 24 and 28 are considered caps for the splines of the transaxle ends 36 and 46 of the first and second driveshaft axles 20 and 26. The first and second caps 24 and 28 also serve as seals to prevent contamination and leaks. The first and second caps 24 and 28 are dimensioned for a sealing or a snug fit over the transaxle ends 36 and 46. The first and second caps 24 and 28 can be maintained on the first and second driveshaft axles 20 and 26 up until the moment of installation such that exposure of the transaxle ends 36 and 46 to the environment is kept minimal. The first and second caps 24 and 28 are also readily removable upon installation with the transaxle 16 and can be discarded with convenience as will be further described below.

Figure 8:
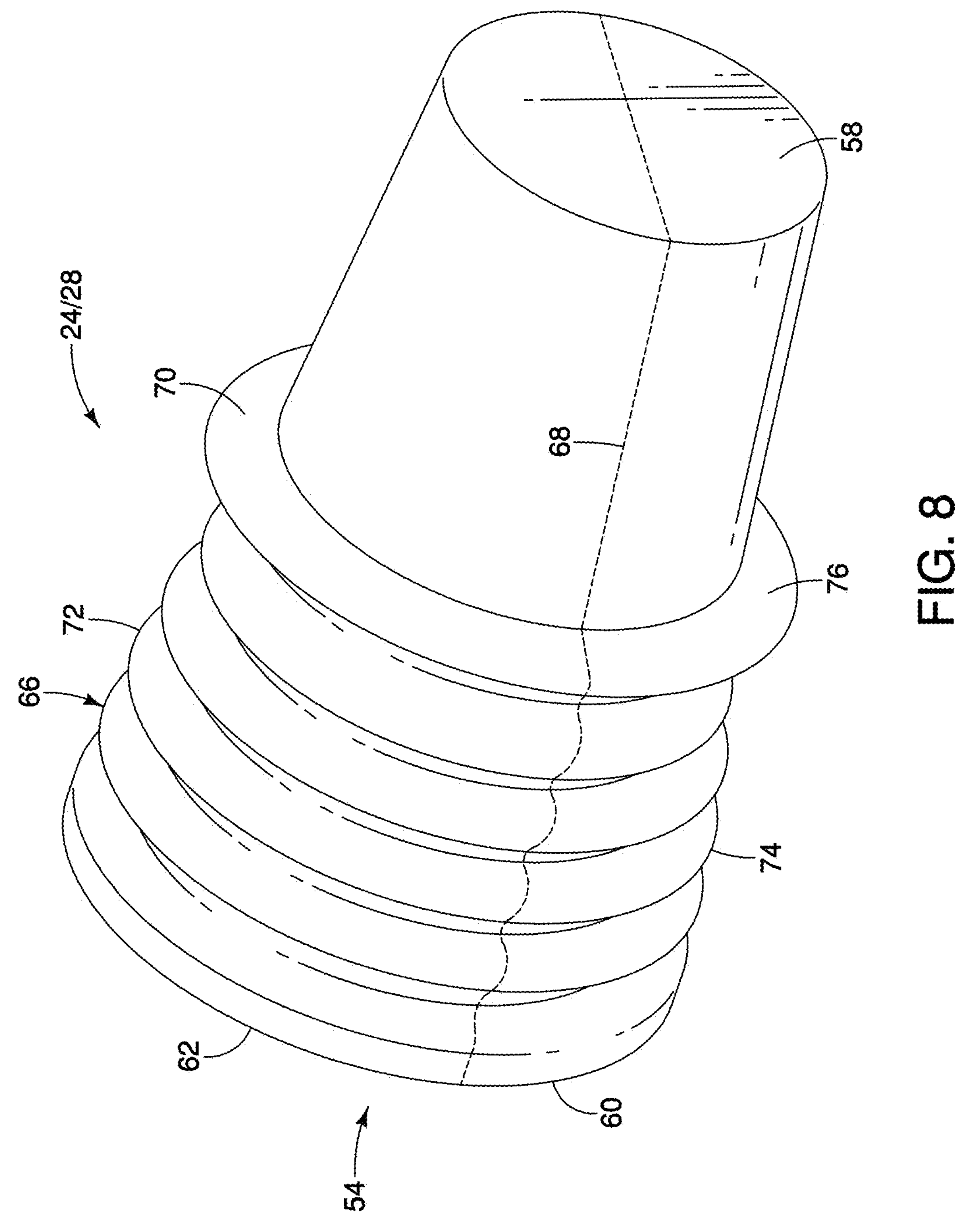
FIG. 8 is a perspective view of the protective cap.

The first and second caps 24 and 28 are identical except for their location on the driveshaft assembly 12. Therefore, description of the first and second caps 24 and 28 will be referenced as "the cap" 24 or 28 for simplicity. As best seen in FIGS. 4 to 8, the cap 24 or 28 includes a conical shaped main body 52 defining an internal space 54 of the cap 24 or 28. The cap 24 or 28 has a first end 58 that is closed and a second end 60 that) includes an opening 62 that leads to the internal space 54. As seen in FIG. 8, the first end 58 includes an end wall 56 that encloses the internal space 54. The second end 60 of the cap 24 or 28 receives the transaxle end 36 or 46 of the driveshaft assembly 12. Therefore, the second end 60 is a driveshaft receiving end. The second end 60 includes the opening that leads to the internal space 54 such that the transaxle end 36 sits in the internal space of the cap 24 or 28 after insertion.

As best seen in FIGS. 4 and 5, the cap 24 or 28 has a corrugated portion 66 that is collapsible so that the cap 24 or 28 moves between a non-compressed state and a compressed state as the transaxle end 36 is inserted into the vehicle transaxle 16. That is, the corrugated portion 66 is collapsible so that the cap 24 or 28 moves between the non-compressed state (FIG. 4) and the compressed state (FIG. 5). The cap 24 or 28 is in the non-compressed state prior to installation of the first driveshaft axle 20 with the transaxle 16. That is, the non-compressed state is a rest state or a covering state of the cap 24 or 28. The cap 24 or 28 moves into the compressed state upon the insertion of the driveshaft axle 20 or 26 into the transaxle 16. That is, the friction with the transaxle 16 during installation of the driveshaft axle 20 or 26 breaks the end wall 56 and causes the cap 24 or 28 to compress.

Figures 6, 7:
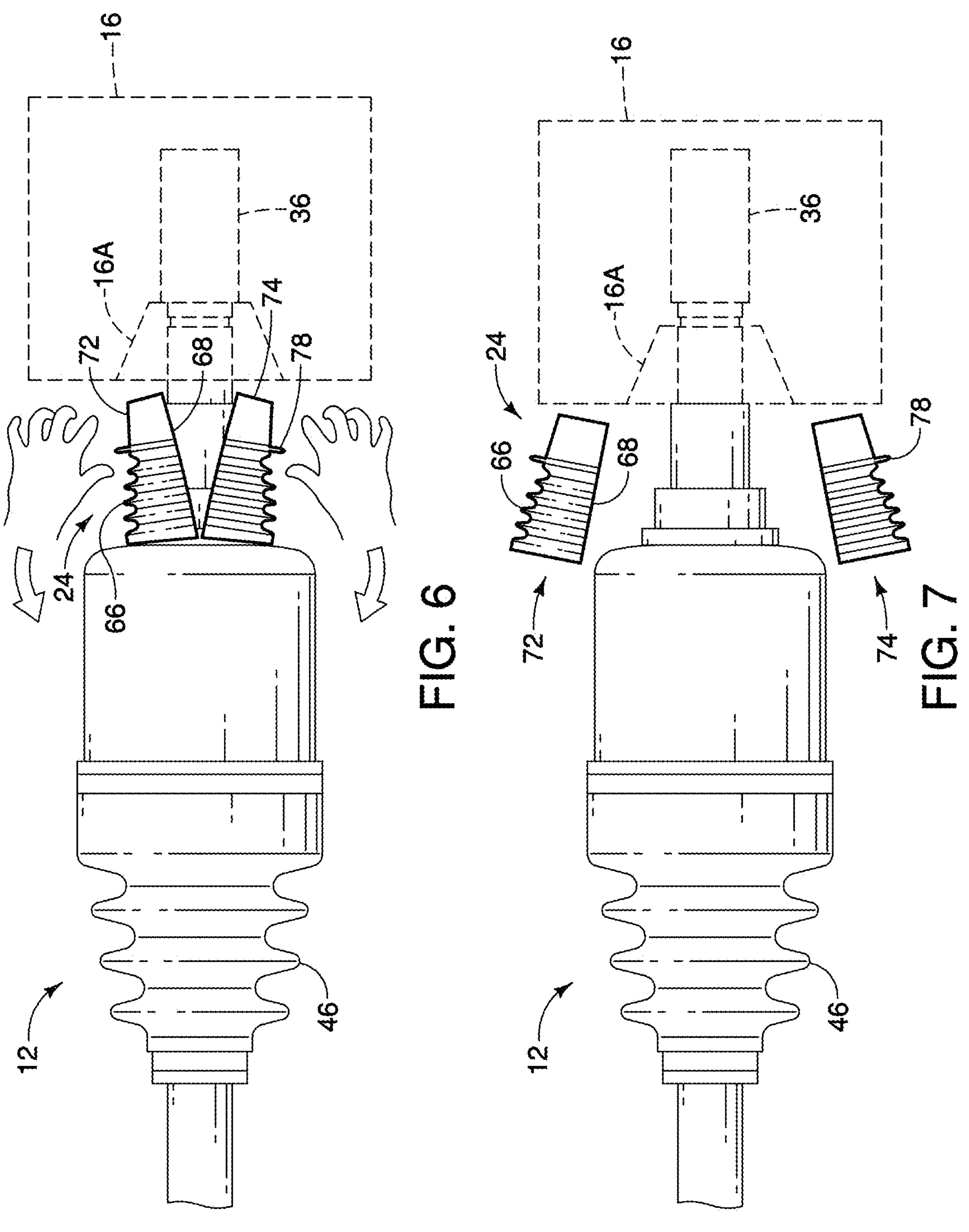
FIG. 6 is an enlarged view similar to FIG. 5 but with the protective cap compressing upon user operation.
FIG. 7 is an enlarged view similar to FIG. 6 but with the protective cap breaking apart.

As shown, the cap 24 or 28 includes a plurality of perforations 68. The perforations 68 are disposed at a midline of the cap 24 or 28 to separate the cap 24 or 28 into a first piece 72 and a second piece 74 as the cap 24 or 28 compresses as seen in FIG. 7. The cap 24 or 28 separates at the perforations 68 and compresses as the transaxle end 36 of the driveshaft is inserted into the transaxle 16. The end wall 56 breaks apart at the perforations 68 during installation.

The cap 24 or 28 further includes a user operations tab 70 provided on the main body 52. The user operations tab 70 is provided on the main body 52 at both the first and second pieces 72 and 74. The user operations tab 70 allows a user to separate the cap 24 or 28 and compress the cap 24 or 28 as the driveshaft assembly 12 is inserted into the vehicle transaxle 16. That is, during installation, the user pulls at the user operations tab 70 as the first driveshaft axle 20 is inserted into the transaxle 16 such that installation with the transaxle 16 and pulling at the user operations tab 70 breaks and compresses the cap for easy removal from the first driveshaft axle 20 and can then be discarded. The cap 24 or 28 is preferably a one-piece molded plastic member that is not rigid.

Referring to FIGS. 2 to 7, a method for installing a vehicle driveshaft (e.g., the first driveshaft axle 20) to the transaxle 16 is provided in accordance with the illustrated embodiment. The method comprises inserting the first cap 24 over the transaxle end 36 of the first driveshaft axle 20 as seen in FIGS. 2 and 3. The method further comprises inserting the transaxle end 36 into the first opening 16A of the vehicle transaxle 16. The method further comprises operating the user operations tab 70 of the first cap 24 to compress the first cap 24 at the corrugated portion 66 as seen in FIG. 5. The method further comprises removing the first cap 24 from the transaxle end 36 by breaking the first cap 24 at the perforations 68 of the first cap 24 so that the first cap 24 separates into the first piece 72 and the second piece 74 as seen in FIG. 6. The first cap 24 can then be discarded and completely removed from the first driveshaft axle 20 as seen in FIG. 7.

The method further comprises inserting the second cap 28 over the transaxle end 46 of the second driveshaft axle 26 similar to that for the first cap 24 over the transaxle end 46 of the first driveshaft axle 20. The method further comprises inserting the transaxle end 46 of the second driveshaft axle 26 into the second opening 16B of the vehicle transaxle 16. The method further comprises operating a user operations tab 70 of the second cap 28 to compress the second cap 28 at a corrugated portion 66. The method further comprises removing the second cap 28 from the transaxle end 46 by breaking the second cap 28 at the perforations 68 of the second cap 28 so that the second cap 28 separates into a first piece 72 and a second piece 74.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle driveshaft assembly. Accordingly, these terms, as utilized to describe the present invention should be interpreted relative to a vehicle equipped with the vehicle driveshaft assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle driveshaft assembly comprising:

a first driveshaft axle having a transaxle end for being installed to a vehicle transaxle, the first driveshaft axle having a wheel end for being installed to a first vehicle wheel, the first driveshaft axle further having a constant velocity joint disposed between the transaxle end and the wheel end; and a first cap provided over the transaxle end, the first cap having a corrugated portion that is compressible so that the first cap moves between a non-compressed state and a compressed state as the transaxle end is inserted into the vehicle transaxle.

2. The vehicle driveshaft assembly according to claim 1, wherein the first cap includes a conical shaped main body defining an internal space, a first end that is closed and a second end that includes an opening that leads to the internal space.

3. The vehicle driveshaft assembly according to claim 2, wherein the second end of the first cap receives the transaxle end of the driveshaft.

4. The vehicle driveshaft assembly according to claim 3, wherein the first cap includes a plurality of perforations, the first cap separating at the perforations and compressing as the transaxle end of the driveshaft is inserted into the vehicle transaxle.

5. The vehicle driveshaft assembly according to claim 4, wherein the first cap includes a user operations tab provided on the main body to allow a user to separate the cap and compresses the cap as the driveshaft is inserted into the vehicle transaxle.

6. The vehicle driveshaft assembly according to claim 5, wherein the first cap is a one-piece molded plastic member.

7. The vehicle driveshaft assembly according to claim 6, further comprising a second driveshaft axle having a transaxle end for being installed to the vehicle transaxle, the second driveshaft axle having a wheel end for being installed to a second vehicle wheel, and a second cap provided over the transaxle end of the second driveshaft axle, the cap having a corrugated portion that is compressible so that the second cap moves between a non-compressed state and a compressed state as the transaxle end of the second driveshaft axle is inserted into the vehicle transaxle.

8. A vehicle driveshaft cap comprising:

a conical shaped main body defining an internal space of the vehicle driveshaft cap;

a first end that is closed;

a second end that includes an opening that leads to the internal space, the second end being a driveshaft receiving end, the internal space of the vehicle driveshaft cap being configured to receive a vehicle driveshaft;

a corrugated portion that is compressible so that the vehicle driveshaft cap moves between a non-compressed state and a compressed state; and a first plurality of perforations extending from the second end to the first end, a second plurality of perforations extending across the closed first end, and a third plurality of perforations extending from the first end to the second end, the first, second and third plurality of perforations being configured to separate the vehicle driveshaft cap into a first piece separate from the second piece.

9. The vehicle driveshaft cap according to claim 8, wherein the second plurality of perforations passes through a center of the closed first end.

10. The vehicle driveshaft cap according to claim 9, further comprising a user operations tab provided on the main body at both the first and second pieces.

11. The vehicle driveshaft cap according to claim 10, wherein the vehicle driveshaft cap is a one-piece molded plastic member.

12. The vehicle driveshaft cap according to claim 8, wherein the first plurality of perforations are oppositely disposed to the third plurality of perforations.

13. The vehicle driveshaft cap according to claim 8, wherein the first plurality of perforations, the second plurality of perforations and the third plurality of perforations are substantially continuously formed to facilitate separating the vehicle driveshaft cap into separate first and second pieces.

14. A method for installing a vehicle driveshaft to a vehicle transaxle, the method comprising:

inserting a first cap over a transaxle end of a first driveshaft axle, the first drive axle having a wheel end that is an opposite end of the first driveshaft axle with respect to the transaxle end;

inserting the transaxle end into a first opening of the vehicle transaxle;

operating a user operations tab of the first cap to compresses the first cap at a corrugated portion; and removing the first cap from the transaxle end by breaking the first cap at perforations of the first cap so that the first cap separates into a first piece and a second piece.

15. The method according to claim 14, further comprising:

inserting a second cap over a second end of a second driveshaft axle, the second drive axle having a wheel end that is an opposite end of the second driveshaft axle with respect to the transaxle end;

inserting the transaxle end of the driveshaft into a second opening of the vehicle transaxle;

operating a user operations tab of the second cap to compresses the second cap at a corrugated portion; and removing the second cap from the transaxle end by breaking the second cap at perforations of the second cap so that the second cap separates into a first piece and a second piece.

* * * * *